United States Patent [19]
Morawski et al.

[15] 3,707,293
[45] Dec. 26, 1972

[54] MULTI-JAW CHUCK

[72] Inventors: London T. Morawski, Mount Clemens; John J. Parker, Warren, both of Mich.

[73] Assignee: The John J. Parker Living Trust, by said Parker, a part interest

[22] Filed: Dec. 24, 1970

[21] Appl. No.: 101,209

[52] U.S. Cl. .......................279/110, 279/1 J, 279/123
[51] Int. Cl. .............................................B23b 31/10
[58] Field of Search..........279/1 J, 60, 110, 119, 123

[56] References Cited

UNITED STATES PATENTS 3,248,122  4/1966  Roddy....................................279/110

Primary Examiner—Francis S. Husar
Attorney—Barnes, Kisselle, Raisch & Choate

[57] ABSTRACT

A chuck having a plurality of jaw carrying rods axially movable within bores inclined relative to the chuck axis. The rods may be axially shifted in opposite directions by a jaw actuator to thereby increase and decrease the diameter of the circle defined by the jaws for engaging and disengaging the peripheral surface of a workpiece. If the peripheral surface of the workpiece is either out of round or eccentric, one of the jaws is moved axially relative to another to ensure that all the jaws grip the workpiece. A plurality of guideways formed in the forward external surface of the chuck guide the jaws and render them accessible for quick replacement.

20 Claims, 5 Drawing Figures

INVENTORS
LONDON T. MORAWSKI
JOHN J. PARKER

BY
Barnes, Kisselle, Raisch & Choate

ATTORNEYS

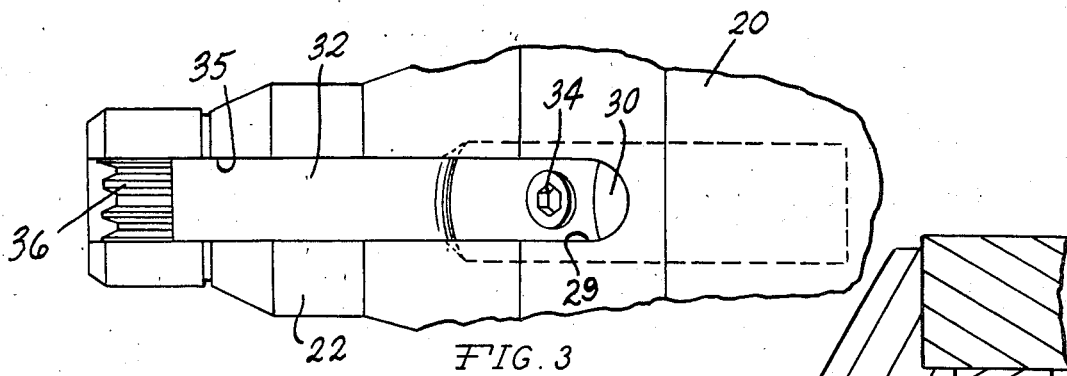
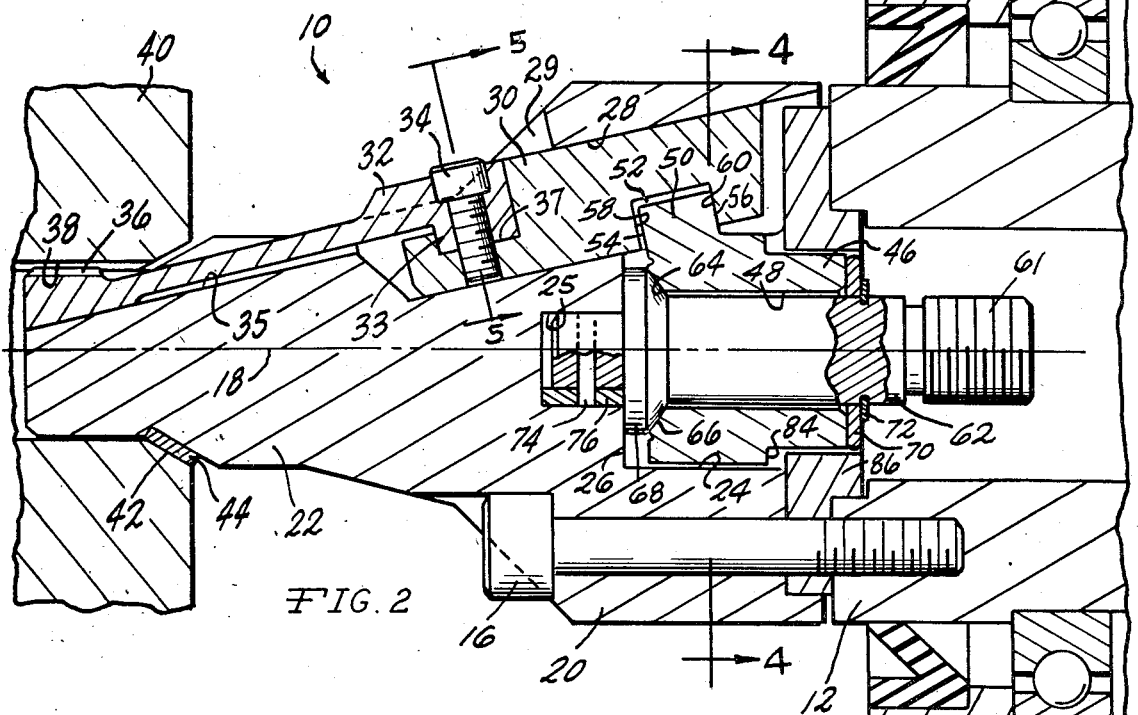
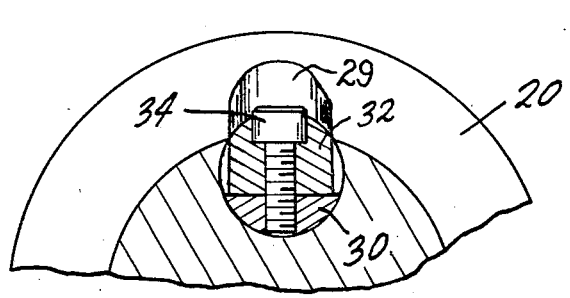
INVENTORS
LONDON T. MORAWSKI
JOHN J. PARKER
BY
Barnes, Kisselle, Raisch & Choate
ATTORNEYS

MULTI-JAW CHUCK

This invention relates to chucks and particularly to multi-jaw chucks of the drawbar type especially adapted for holding castings and forgings.

One such type of chuck has three jaws circumferentially spaced equidistantly around the chuck axis for gripping a peripheral surface of a workpiece so as to maintain the workpiece coaxial with the chuck. If the peripheral surface is truly circular there is no problem. However, should the surface be out of round, the chuck cannot effectively grip the workpiece and still maintain the coaxial alignment of the workpiece with the chuck. It is also advantageous to replace only the chuck jaws rather than the entire chuck when changing over to different sized workpieces.

Therefore, the principal object of this invention is the provision of a multi-jaw chuck of the drawbar type which can rigidly grip a peripheral surface of a workpiece so as to maintain the coaxial alignment of the workpiece with the chuck even if the surface is slightly out of round or eccentric.

Another object of this invention is the provision of a multi-jaw chuck of the drawbar type which allows any one of the chuck jaws to move radially a greater or lesser extent than another jaw so that a workpiece may be effectively gripped about an out-of-round peripheral surface.

It is also an object of this invention to provide a multi-jaw chuck of the drawbar type having a lug ring for shifting the chuck jaws which is swively supported to allow the jaws to be moved axially and radially relative to one another so that an out-of-round workpiece may be rigidly supported on the chuck.

Still another object of this invention is the provision of a multi-jaw chuck of the drawbar type in which the jaws may be quickly and easily replaced.

Other features and objects of the invention will become apparent in the following description and drawings in which:

FIG. 2 is a sectional view taken along line 2—2 in FIG. 1.

FIG. 3 is a top view of a portion of FIG. 2.

FIG. 5 is a sectional view taken along line 5—5 in FIG. 2.

Figure 1:
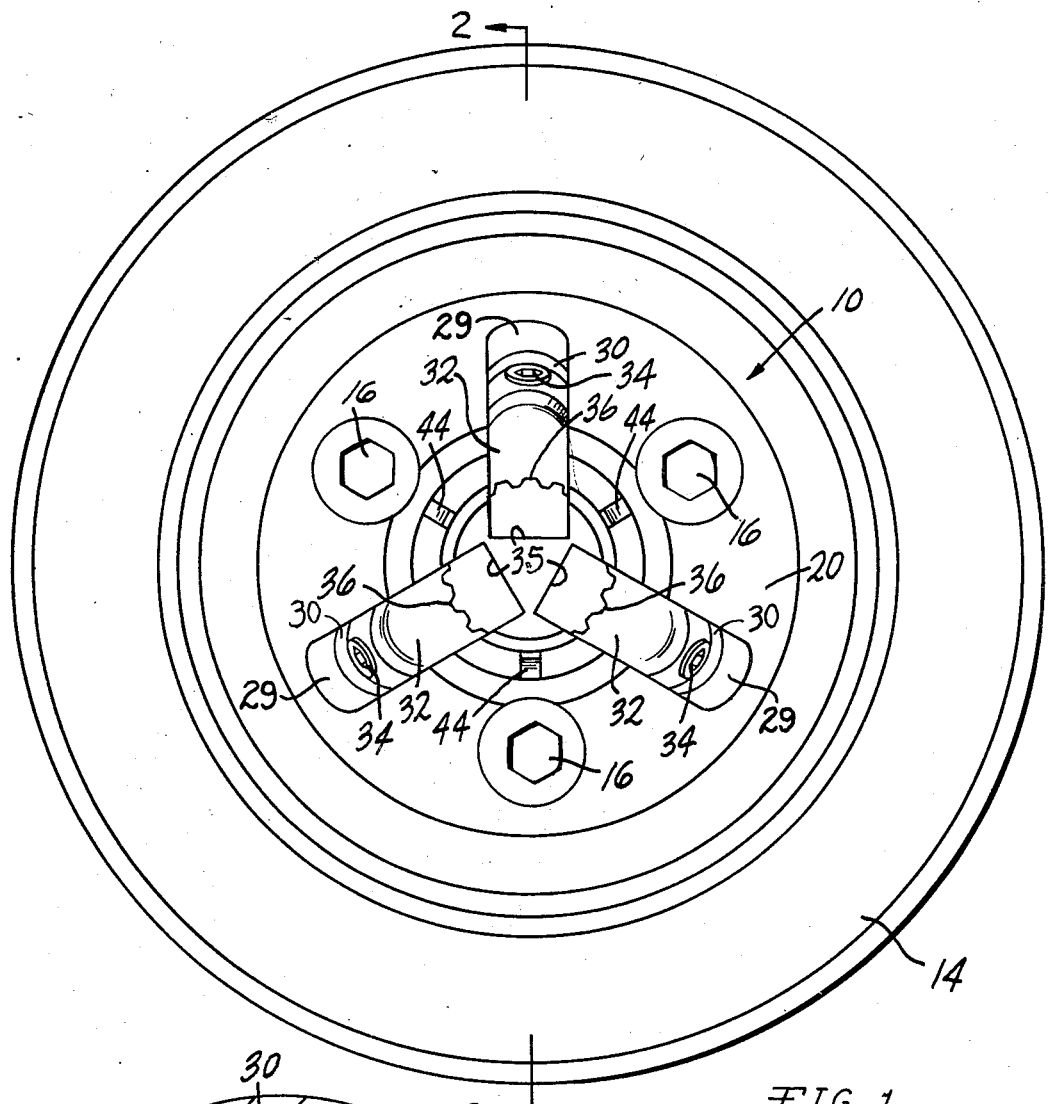
FIG. 1 is a front elevational view of a chuck of the present invention.
Figure 4:
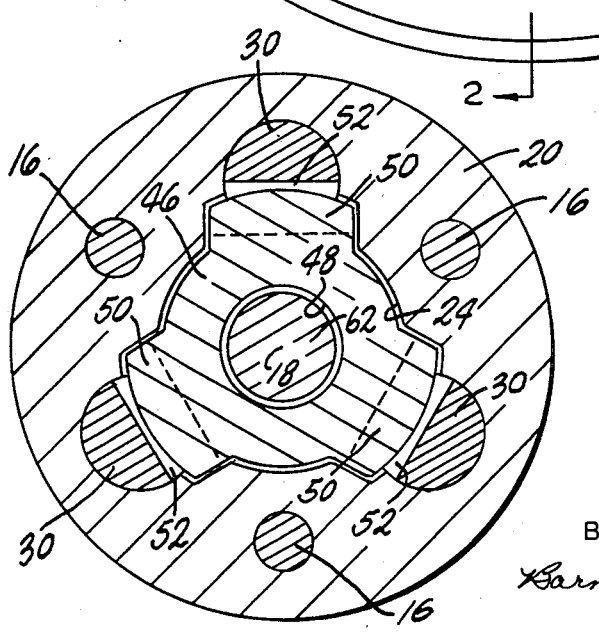
FIG. 4 is a sectional view taken along line 4—4 in FIG. 2.

Referring now to the drawings and particularly to FIGS. 1 and 2, a multi-jaw chuck 10 of the present invention is shown mounted on the front of a spindle 12 of a machine tool 14 by means of bolts 16 circumferentially spaced about chuck axis 18. Chuck 10 comprises a generally cylindrical body 20 having a tapered body extension 22 extending axially forwardly therefrom.

A central axial bore 24 extends forwardly from the rear of body 20. The size of the bore is reduced as at 25 to thereby provide a shoulder 26 within bore 24. A plurality of three similarly inclined circular bores 28 are arranged in body 20 with their rearward portions communicating with bore 24. Bores 28 are inclined radially outwardly in the rearward direction, and when viewed from the front of the chuck are equidistantly circumferentially spaced apart.

Identical jaw carrying rods 30 are slidably arranged one within each bore 28. Identical jaws 32 are attached one to the forward end of each rod 30 by bolts 34, and are guided within rectangularly-shaped guideways 35 in body extension 22. Guideways 35 are similarly inclined to the same degree as bores 28 relative to axis 18. A tongue 33 is formed in the rearward end of each jaw 32 to project radially inwardly toward axis 18 for locking engagement with a groove 37 in each jaw carrying rod 30. This construction offers two important advantages. First, bolts 34 can be conveniently unfastened to permit jaws 32 to be lifted out of guideways 35 and recesses 29 for replacement. Secondly, tongue 33 is closely fitted to groove 37 to accurately position jaw 32 on jaw carrying rod 30 and to provide an efficient force-transmitting connection therebetween. Jaws 32 have serrations 36 on the forward ends thereof for gripping the inner peripheral surface 38 of a workpiece 40. Three pads 44 on body extension 22 define a conical locating surface concentric with the axis of the chuck. These pads are adapted to engage a machined chamfer 42 on workpiece 40 to center and maintain it in coaxial alignment with chuck 10 prior to and during gripping thereof by jaws 32.

Arranged within bore 24 is an annular lug ring 46 having a central axial bore 48. Three equally spaced lugs 50 project radially outwardly from lug ring 46 for engagement with notches 52 in jaw rods 30. Lugs 50 have forward and rear faces 54 and 56 respectively, while notches 52 have faces 58 and 60 which are adapted to abut faces 54 and 56 respectively. Lug ring 46 is operatively connected to a rod 62 (as will be later described) for axial movement within bore 24. Rod 62 is in turn adapted to be connected as at 61 to a drawbar (not shown) on machine tool 14. Thus, as lug ring 46 is axially shifted within bore 24, jaws 30 are shifted axially within their respective bores 28 in a direction inclined to axis 18.

Not only does the operative connection of lug ring 46 to rod 62 allow lug ring 46 to be axially shifted, but it also allows lug ring 46 to swivel on rod 62. The forward end of lug ring 46 is spheroidally contoured as at 64 so as to seat on a correspondingly spheroidally contoured shoulder 66 on a head 68 on rod 62. Lug ring 46 is retained on rod 62 with a slight axial clearance (not shown) by a spacer 70 and a retaining ring 72. The diameters of bores 24 and 48 are slightly greater than the diameters of lug ring 46 and rod 62 respectively, and thus enable lug ring 46 to swivel on rod 62 about the geometric center of spheroidal contours 64 and 66 which in the embodiment shown lies on axis 18 axially forward of lugs 50. With this arrangement, rods 30 are shifted in unison within their respective inclined bores 28 so long as they are disengaged from workpiece 40; but when one of them engages the workpiece before another, lug ring 46 swivels so as to move the disengaged rod axially further relative to the engaged rod and bring it in engagement with workpiece 40.

The forward end of rod 62 is provided with a pin 74 which serves to guide rod 62 axially within a keyway 76 in bore 25. The forward movement of rod 62 is limited by the engagement of head 68 with shoulder 26, while the rearward limit is established by the engagement of a shoulder 84 on lug ring 46 with an annular stop ring 86 which separates body 20 from spindle 12.

The novel features of chuck 10 are more fully appreciated by describing the cooperation of the moving elements when gripping a workpiece having an out-of-round hole. For illustration, surface 38 is assumed to be either eccentric relative to chamfer 42 or an out-of-round hole having an oversize radius adjacent jaw 32. Therefore, with chuck 10 in the position shown in FIG. 2, jaw 32 shown in FIG. 2 is not yet gripping hole 38 whereas the other two jaws 32 are in contact therewith. As rod 62 is shifted to the right, and with the workpiece seated firmly on pads 44, the reactions of the jaws not shown in FIG. 2 with hole 38 cause lug ring 46 to swivel clockwise on shoulder 66. Since sufficient clearances are provided between lugs 50 and notches 52, this arrangement forces the lug 50 engaging notch 52 in the illustrated rod 30 to move axially rearwardly relative to the other two lugs so that the illustrated jaw 32 moves axially rearwardly of the other two jaws to also grip workpiece 40. Thus, all three jaws 32 rigidly grip workpiece 40 while chamfer 42 remains seated on extension 22 to maintain the coaxial alignment of workpiece 40 and chuck 10.

It should be pointed out that the clearances shown in FIG. 2 are greatly exaggerated for the purposes of illustration. Customarily, the tolerances in a good quality workpiece are on the order of a few thousandths of an inch, and therefore the tolerances required between the moving elements of chuck 10 are of the same order.

Jaw rods 30 and lug ring 46 are readily assembled into body 20. Jaw rods 30 are inserted within bores 28 such that notches 52 are radially spaced from axis 18 a distance greater than the radial projection of lugs 50. Next, rod 62 with lug ring 46 thereon is inserted into bore 24 so that lugs 50 and notches 52 of jaw rods 30 are axially aligned. The simultaneous axially forward movement of lug ring 46 and jaw rods 30 causes jaw rods 30 to move radially inwardly such that notches 52 are brought into engagement with lugs 50. Stop ring 86 is then placed on the rear of body 20, and chuck 10 may then be mounted on spindle 12.

The particular embodiment shown in the drawings is but one form of the present invention. For example, other variations might have bores 28 inclined radially inwardly in the rearward direction enabling rods 30 to grip an outside circular edge of a workpiece; still other variations might include different arrangements for swiveling lug ring 46 on rod 62.

The operating description of chuck 10 herein with respect to gripping surface 38 is merely illustrative of the advantageous features of this invention. It should be clearly understood that the engagement of any one of jaws 32 with any out-of-round or eccentric hole causes a reaction whereby lug ring 46 is swiveled on rod 62 to bring a second jaw 32 into engagement therewith. The combined reactions of these two jaws 32 then swivel lug ring 46 to finally bring the third jaw 32 into engagement with the workpiece. In this way an out-of-round or eccentric peripheral surface of a workpiece may be rigidly gripped on chuck 10 and the workpiece maintained in coaxial alignment therewith regardless of the orientation of the out-of-round or eccentric surface about chuck axis 18.

We claim:

1. A chuck adapted to be mounted on a rotary spindle of a machine tool for retaining a workpiece thereon comprising a body having an axis coaxial with the spindle axis, a plurality of bores similarly inclined relative to the body axis and extending rearwardly from the front of the body, a jaw carrier axially slidable within each of said inclined bores and having a jaw on the forward end thereof, an axially movable jaw actuator and means operatively connecting said jaw actuator with said jaw carriers comprising means for causing said jaw carriers to shift axially in unison in response to axial movement of said jaw actuator and for permitting any one of said jaw carriers to shift axially in response to axial movement of said jaw actuator when axial movement of another of said jaw carriers is arrested.

2. The combination called for in claim 1 including a central axial bore extending forwardly from the rear of the body, said jaw actuator being axially movable within said central axial bore.

3. The combination called for in claim 2 wherein the rearward ends of said inclined bores communicate with said central bore.

4. The combination called for in claim 1 wherein said means operatively connecting said jaw actuator with said jaw carriers comprises a member on said jaw actuator axially movable therewith and swivelled thereon for pivotal movement about a point on said axis and means extending radially outwardly from said member for engagement with said jaw carriers.

5. The combination called for in claim 4 wherein said means operatively connecting said jaw actuator with said jaw carriers further comprises a spheroidally contoured head on said jaw actuator and a spheroidally contoured portion on said member seated on said spheroidally contoured head.

6. The combination called for in claim 5 wherein said member comprises a ring having said spheroidally contoured portion on the forward end thereof, said jaw actuator extending rearwardly through said ring from said spheroidally contoured head and including means on said jaw actuator for retaining said member thereon.

7. The combination called for in claim 4 wherein said radially outwardly extending means is engaged with each of said jaw carrying rods by means of a notch and a lug.

8. The combination called for in claim 4 including a notch in each of said jaw carrying rods, said radially outwardly extending means comprising a plurality of lugs, each of said lugs engaging one of said notches.

9. The combination called for in claim 8 wherein said lugs and said notches are dimensioned to provide radial and axial clearances therebetween to allow said member to swivel relative to said jaw carriers.

10. The combination called for in claim 6 further including a tubular extension on the rearward end of said ring, said jaw actuator extending rearwardly through said tubular extension and wherein said jaw actuator and said tubular extension are dimensioned to provide clearance therebetween to allow said ring to swivel on said jaw actuator.

11. The combination called for in claim 10 wherein slight axial clearance is provided between the rearward end of said tubular extension and said retaining means to allow said ring to swivel on said jaw actuator.

12. The combination called for in claim 10 wherein said central axial bore and said tubular extension are dimensioned to provide clearance therebetween to allow said ring to swivel on said jaw actuator.

13. The combination called for in claim 4 wherein said inclined bores are inclined radially outwardly in the rearward direction.

14. The combination called for in claim 4 wherein said plurality of bores comprises three bores circumferentially spaced equally apart about said axis.

15. The combination called for in claim 4 including means defining a conical locating surface on said chuck concentric with said body axis and adapted to engage a chamfer on a workpiece to thereby center and maintain the workpiece in coaxial alignment with the chuck.

16. A chuck adapted to be mounted on a rotary spindle of a machine tool for retaining a workpiece thereon comprising a body having an axis coaxial with the spindle axis, a plurality of bores similarly inclined relative to the body axis, said bores extending rearwardly from the front of the body, a slide member slideably arranged within each of said inclined bores, means for shifting said slide members within their respective inclined bores, a rigid body extension extending forwardly of said body and having a plurality of guideways therein similarly inclined relative to the body axis to the same degree as said inclined bores and circumferentially aligned therewith, a jaw member extending lengthwise in and guided for lengthwise movement within each of said guideways and means accessible externally of said body and said extension for detachably attaching each of said jaw members adjacent one end to its associated slide member, said last mentioned means including axially overlapped adjacent end portions of each slide and jaw member having radially extending interengaged shoulders for causing said jaw members to move lengthwise in said guideways in response to axial movement of said slides and fastening means extending radially through said axially overlapped portions.

17. The combination called for in claim 16 wherein said radially interengaged shoulders are defined by a radially projecting tongue in one of said members engaging a radially facing groove in the other of said members.

18. The combination called for in claim 16 including means adjacent the other end of each jaw member radially supported at one side by said extension and having a radially facing work engaging portion on the radially opposite side thereof.

19. The combination called for in claim 18 wherein said guideways are defined by grooves in a radially exposed surface portion of said extension, said grooves being radially open at the side thereof corresponding to the work engaging portion of said jaw member.

20. The combination called for in claim 1 wherein said means operatively connecting said jaw actuator with said jaw carriers comprises a member on said jaw actuator axially movable therewith and swivelled thereon for pivotal movement about a point on said axis and means extending radially of said member and each said jaw carriers to interconnect them for lengthwise movement of the jaw carriers in response to swivelling and axial movement of said member.

* * * * *